US008915104B2

United States Patent
Beihoff et al.

(10) Patent No.: US 8,915,104 B2
(45) Date of Patent: Dec. 23, 2014

(54) HEAT PUMP (SERVER) COUPLED WASHER AND DRYER PAIR

(76) Inventors: Bruce C. Beihoff, Stevensville, MI (US); Nihat O. Cur, Saint Joseph, MI (US); Kirk M. Dunsbergen, Stevensville, MI (US); Joel A. Luckman, Benton Harbor, MI (US); Richard A. Sunshine, Granger, IN (US); Tao Xie, Benton Harbor, MI (US)

( * ) Notice: Subject to any disclaimer, the term of this patent is extended or adjusted under 35 U.S.C. 154(b) by 1153 days.

(21) Appl. No.: 12/858,799

(22) Filed: Aug. 18, 2010

(65) Prior Publication Data

US 2011/0041564 A1    Feb. 24, 2011

Related U.S. Application Data

(60) Provisional application No. 61/234,674, filed on Aug. 18, 2009.

(51) Int. Cl.
| | |
|---|---|
| D06F 39/00 | (2006.01) |
| D06F 58/20 | (2006.01) |
| D06F 29/00 | (2006.01) |
| F28D 20/02 | (2006.01) |
| A47L 15/00 | (2006.01) |
| F28D 20/00 | (2006.01) |

(52) U.S. Cl.
CPC .............. *F28D 20/02* (2013.01); *D06F 58/206* (2013.01); *A47L 15/0097* (2013.01); *D06F 29/005* (2013.01); *F28D 2020/006* (2013.01); *Y02E 60/145* (2013.01); *Y02B 30/123* (2013.01); *Y02B 30/52* (2013.01); *D06F 39/006* (2013.01)
USPC ............................................................ 68/27

(58) Field of Classification Search
CPC ..... D06F 29/00; D06F 29/005; D06F 39/006; D06F 58/206
USPC .................................................................. 68/27
See application file for complete search history.

(56) References Cited

U.S. PATENT DOCUMENTS

| | | | | |
|---|---|---|---|---|
| 3,771,238 A | * | 11/1973 | Vaughn | 34/86 |
| 4,275,510 A | * | 6/1981 | George | 34/90 |
| 4,891,892 A | * | 1/1990 | Narang | 34/86 |

(Continued)

FOREIGN PATENT DOCUMENTS

| | | |
|---|---|---|
| DE | 2161495 A1 | 6/1973 |
| DE | 10045174 | 5/2002 |

(Continued)

OTHER PUBLICATIONS

European Search Report for Corresponding EP 12172760.6, Nov. 5, 2012.

*Primary Examiner* — Joseph L Perrin

(57) ABSTRACT

An appliance system that includes an appliance group containing at least two appliances, a first appliance designed to perform a first consumer function related to the first appliance and a second appliance that is separate from the first appliance and designed to perform a second consumer function related to the second appliance. The appliance system also includes a thermal energy generator, typically a heat pump, where the thermal energy heats at least one thermal energy bearing fluid and is operably connected to the first and second appliances to deliver thermal energy to the first and second appliances simultaneously or at different times via one or more of the thermal energy bearing fluids.

18 Claims, 4 Drawing Sheets

(56) References Cited

U.S. PATENT DOCUMENTS

| | | | |
|---|---|---|---|
| 5,228,318 A * | 7/1993 | Burgin | 68/207 |
| 6,269,667 B1 | 8/2001 | Back et al. | |
| 6,585,781 B1 | 7/2003 | Roseen | |
| 6,748,772 B2 | 6/2004 | Lee et al. | |
| 7,024,795 B2 | 4/2006 | Tadano et al. | |
| 7,055,262 B2 | 6/2006 | Goldberg et al. | |
| 7,322,123 B2 | 1/2008 | Tadano et al. | |
| 7,325,333 B2 | 2/2008 | Tadano et al. | |
| 7,404,303 B1 | 7/2008 | Barbosa et al. | |
| 7,409,776 B2 | 8/2008 | Ono et al. | |
| 7,526,879 B2 | 5/2009 | Bae et al. | |
| 7,647,663 B2 | 1/2010 | Kim et al. | |
| 7,665,225 B2 | 2/2010 | Goldberg et al. | |
| 2005/0199016 A1 | 9/2005 | Tadano et al. | |
| 2005/0204755 A1 | 9/2005 | Nishiwaki et al. | |
| 2006/0174915 A1 | 8/2006 | Hedstrom et al. | |
| 2007/0251115 A1 * | 11/2007 | Bringewatt et al. | 34/134 |
| 2008/0245087 A1 * | 10/2008 | Orcutt | 62/238.7 |
| 2010/0018262 A1 | 1/2010 | Beihoff et al. | |
| 2010/0024239 A1 | 2/2010 | Kono et al. | |
| 2010/0107703 A1 | 5/2010 | Hisano et al. | |
| 2010/0139111 A1 | 6/2010 | Favret et al. | |
| 2011/0041564 A1 | 2/2011 | Beihoff et al. | |

FOREIGN PATENT DOCUMENTS

| | | |
|---|---|---|
| EP | 1548174 A1 | 6/2005 |
| JP | 2007143712 A | 6/2007 |
| JP | 2008048811 A | 3/2008 |
| JP | 2008284071 A | 11/2008 |
| JP | 2009195362 A | 9/2009 |
| WO | 2011022479 A2 | 2/2011 |

* cited by examiner

HEAT PUMP (SERVER) COUPLED WASHER AND DRYER PAIR

CROSS REFERENCE TO THE RELATED APPLICATION

This application claims priority under 35 U.S.C. §119(e) to and the benefit of U.S. patent application Ser. No. 61/234,674 entitled Heat Pump (Server) Coupled Washer and Dryer Pair to Bruce C. Beihoff et al., filed on Aug. 18, 2009, the entire disclosure which is hereby incorporated by reference.

SUMMARY OF THE INVENTION

An embodiment of the present invention is generally directed toward an appliance system that includes an appliance group where the appliance group has at least two appliances including: a first appliance designed to perform a first consumer function related to the first appliance; a second appliance that is separate from the first appliance where the second appliance is designed to perform a second consumer function related to the second appliance; and a thermal energy generator. A thermal energy generator, according to an embodiment of the present invention heats at least one thermal energy bearing fluid, typically a liquid or gas, and the thermal energy generator is operably connected to the first appliance and the second appliance. The thermal energy generator typically delivers thermal energy to the first and second appliance simultaneously or at different times via one or more of the thermal energy bearing fluids.

Another embodiment of the present invention is generally directed toward an appliance system that includes a washer and dryer group where the washer and dryer each use a separate and independent chamber for processing fabric materials and a heat pump. The heat pump supplies thermal energy to both the washer and dryer.

Yet another embodiment of the present invention is generally directed toward a method of delivering and distributing thermal energy between at least two appliances using a thermal energy generator operably connected to the at least two appliances and one or a plurality of thermal energy bearing fluids. The thermal energy bearing fluids typically transfer thermal energy between the thermal energy generator and the first and second appliances.

Another embodiment generally includes a method of delivering, recovering, storing, and redistributing thermal energy between separate appliances of an appliance group. The method typically includes the steps of providing an appliance group that includes at least two appliances.

A first appliance is designed to perform a first consumer function related to the first appliance and a second appliance that is separate from the first appliance and is designed to perform a second consumer function related to the second appliance. The appliance group further includes a heat pump or other thermal energy generator. A thermal storage unit is also typically provided, and when provided, operably connected to the heat pump (or other thermal energy generator), the first appliance, and the second appliance via one or more conduits to allow water or air (or other thermal energy bearing fluid) to be transferred to and from the heat pump and to and from the first home appliance, the second home appliance, or both. Thermal energy is delivered to a first amount of water or air (or other thermal energy bearing fluid) using the heat pump (or other thermal energy generator) and the heated water or air conveyed to at least one of the first home appliance and the second home appliance. Thermal energy from the heated water or air that remains is typically recovered using a thermal storage unit, when employed. When a thermal storage unit is employed, the recovered thermal energy is stored in the thermal storage unit and redistributed to a second amount of water or air (or other thermal energy bearing fluid) and conveyed to the heat pump (or other thermal energy generator), if further thermal energy is needed or not or directly to at least one of the first or second appliances without additional thermal energy being supplied by the heat pump (or other thermal energy generator).

DETAILED DESCRIPTION OF THE PREFERRED EMBODIMENT

Figure 1:
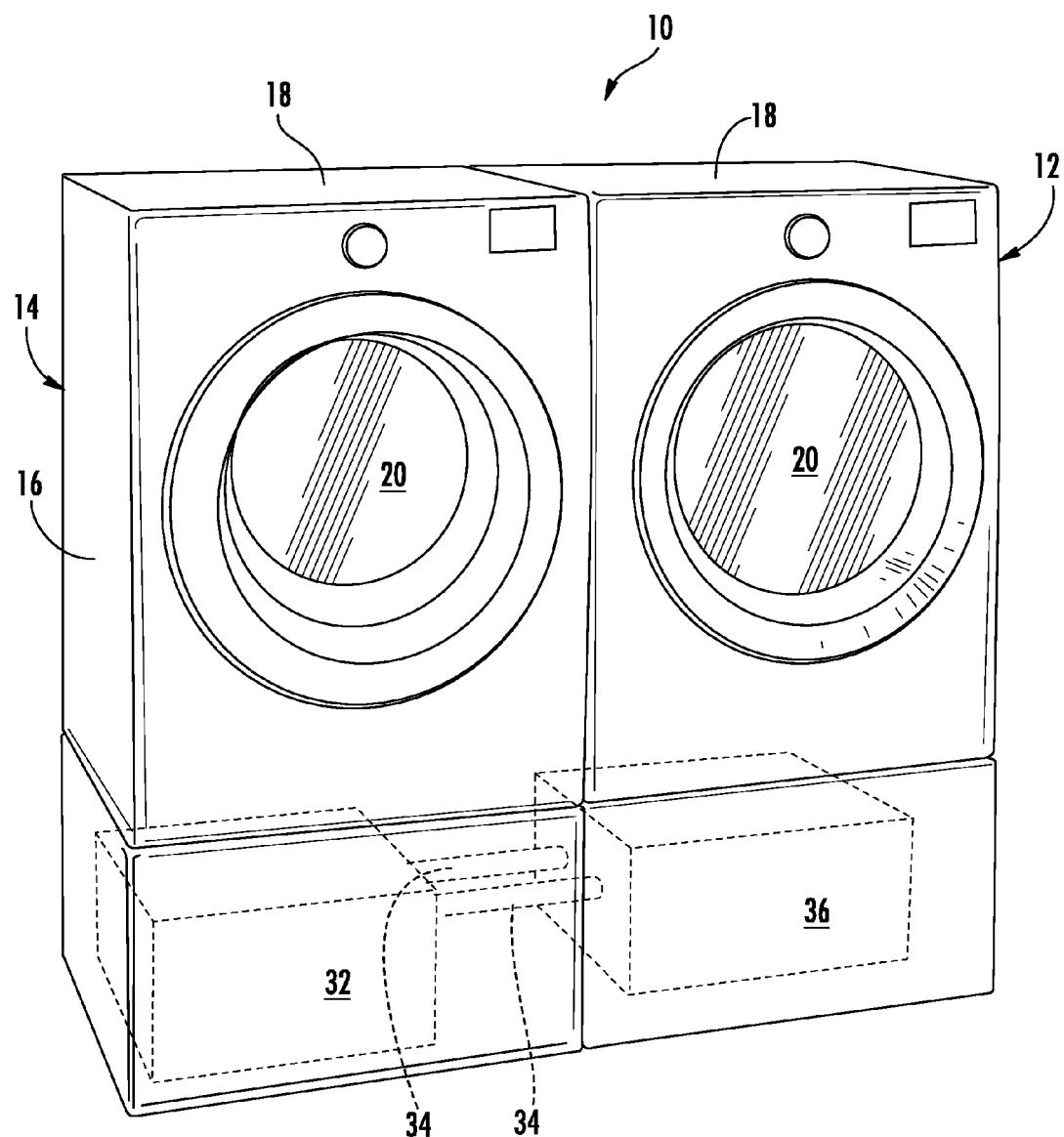
FIG. 1 is a perspective view of an appliance system according to an embodiment of the present invention.

For purposes of description herein, the terms "upper," "lower," "right," "left," "rear," "front," "vertical," "horizontal" and derivatives thereof shall relate to the appliance as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

According to an embodiment of the present invention, an appliance system, typically an appliance system 10 (see FIGS. 1-3) generally includes at least two appliances, a first appliance 12 designed to perform a first consumer function related to the first appliance and a second appliance 14, that is separate from the first appliance, where the second appliance is designed to perform a second consumer function related to the second appliance. The appliance group may include more than two separate appliances but include a third, fourth and thereafter appliances. The appliances of the appliance group or subset of the appliances of the group are typically related appliances in function and proximity within a building, especially a residential housing. For example, the first appliance and second appliance may be a water heater and furnace or, for example, a washer and dryer pair. More broadly speaking, the appliance group may be a first laundry appliance and a second laundry appliance where the first laundry appliance is typically a washing machine and the second laundry appliance is typically a dryer. Other appliances that might be appliances of the appliance systems of the present invention include, but are not limited to, dishwashers, ovens (typically convection ovens), refrigerators, freezers, refrigerator and freezer appliances, and small appliances requiring thermal energy, for example, countertop appliances including coffee makers.

The consumer function of the appliances, when the appliances are laundry appliances, can be selected from the following group: washing, drying, refreshing, sanitizing, stain removal, ironing, hand steaming, sink, and combinations thereof. When the first appliance is a furnace, for example, the consumer function is typically heating of a building, typically a residence. Similarly, the consumer function for a water heater, when a water heater is a part of the appliance group, is heated water.

According to one embodiment of the present invention, the appliance group includes two laundry appliances. The laundry appliances are for washing and drying fabric items, such as clothes and linens. Examples of the laundry appliances include, but are not limited to, a washing machine, including top-loading, front-loading, vertical axis, and horizontal axis washing machines, a dryer, such as a tumble dryer, including top-loading dryers and front-loading dryers, a tumbling refreshing machine, an extractor, a non-aqueous washing apparatus, and cabinet based versions for non-tumble drying and refreshing. The two appliances can be two appliances of the same type, such as two washing machines, two hot water heaters, or two drying machines.

Figure 2:
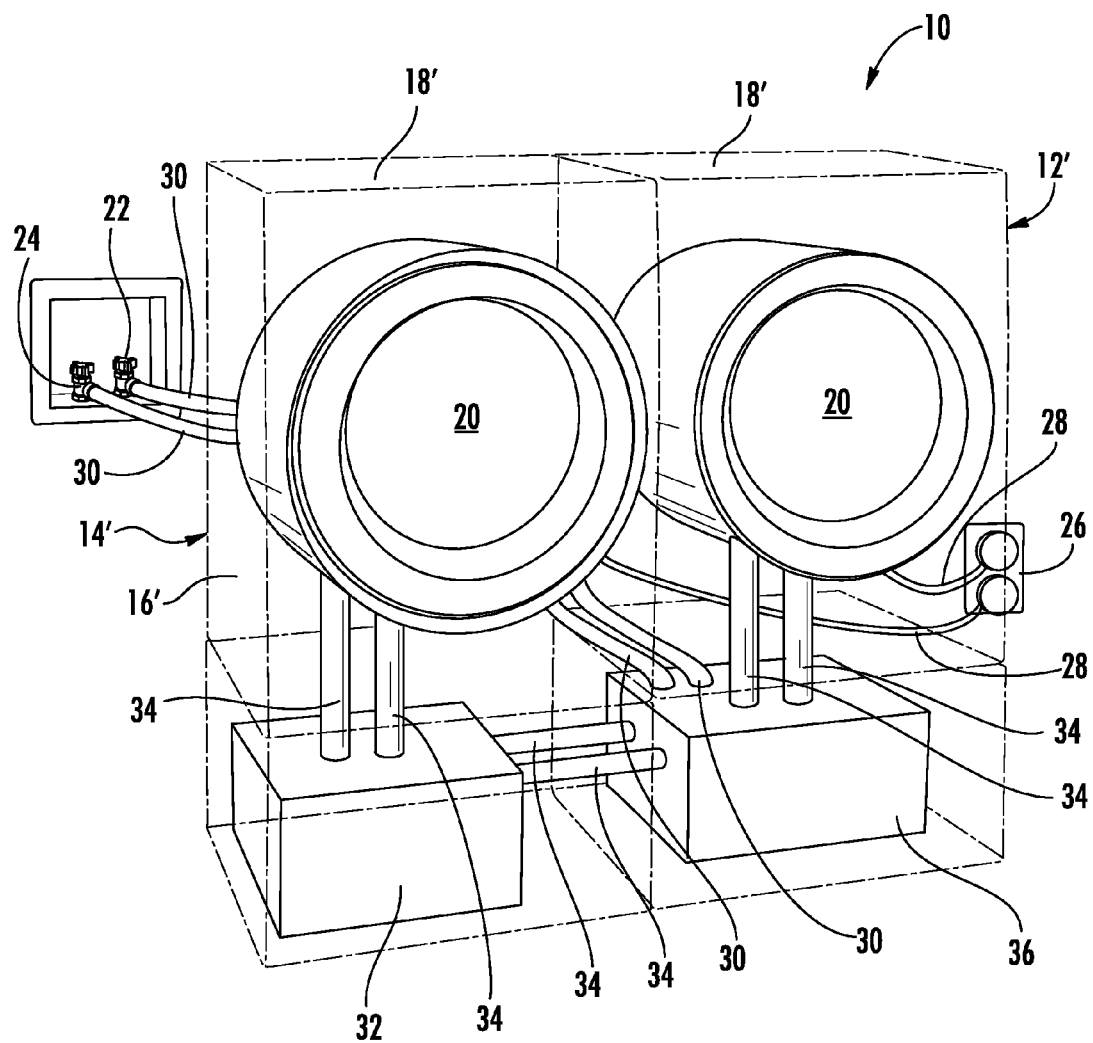
FIG. 2 is an interior perspective view of an appliance system according to an embodiment of the present invention.

When two or more laundry appliances are utilized according to an embodiment of the present invention, the laundry appliances each include a housing that typically includes left side walls 16 and right side walls, front and rear walls, and top walls 18 and bottom walls that together define the housing. A front loading washer and dryer pair are generally shown in FIGS. 1 and 2. The appliances typically employ clear doors 20 mounted to the front surface of the housing and typically hingedly connected thereto. The clear doors allow the user to view the fabric articles within the chamber before, during, and after processing by the appliance. In this manner, the operator can open the door and access fabric and clothing items contained within a chamber for receiving such articles for processing.

As shown generally in FIG. 2, the washer appliance 12 is typically connected to a hot water source 22 and cold water source 24 from the main plumbing of a building, typically a residential dwelling or commercial establishment, requiring the use of a washer. Typically, the washing machine 12 is operably connected to an electrical outlet 26 for receiving electrical power. The dryer appliance 14 is also typically connected to the electrical outlet 26, which is the same or different outlet as the washer 12 is connected to. Optionally, the dryer 14 may also be connected to a water source similar to the washer 12 if direct water resources are necessary to achieve the consumer function or functions of the dryer 14. For example, the dryer 14 may be directly connected to a household plumbing source (hot and cold water, or hot or cold water) or may be connected via appropriate conduit to the same household water source as the washer 12. Water conduits 30, such as flexible hoses, are typically employed for this purpose.

According to one embodiment of the present invention, the appliance group utilizes a thermal energy generator 32 that generates heat, to heat at least one thermal energy bearing fluid. The thermal energy generator is typically operably connected to at least two of the appliances in the appliance group, more typically all of the appliances in the appliance group via appropriate conduits 34 to allow for the delivery of thermal energy to at least two of the appliances of the appliance group at the same or different times via one or more of the thermal energy bearing fluids. Preferably, the thermal energy generator is operably connected to each of the appliances of an appliance group. The thermal energy provided to the appliances by the thermal energy generator via the thermal energy bearing fluids is utilized to perform the consumer functions related to each individual appliance. The thermal energy generator produces heating effects for both the washer and dryer, in an example where the appliance group is a washer and dryer. The thermal energy generator that is typically a heat pump, could be any heating source for use in connection with an appliance, including an electrical resistance heater or combination of thermal energy generators.

According to an embodiment of the present invention, a thermal storage unit 36 may be operably connected to any embodiment of or combination of the present invention. In particular, a thermal storage unit may be operably connected to the appliance group or subset of appliances within the group as well as the thermal energy generator. In particular, the thermal storage unit may be operably connected to the thermal energy generator and the first appliance and the second appliance via one or more conduits to allow one or more energy bearing fluids to be transferred to and from the thermal energy generator and to and from the first appliance and second appliance. In this manner, the thermal storage unit stores thermal energy for later use by one or more utilities and can be delivered to the first appliance and the second appliance when needed.

Figure 3:
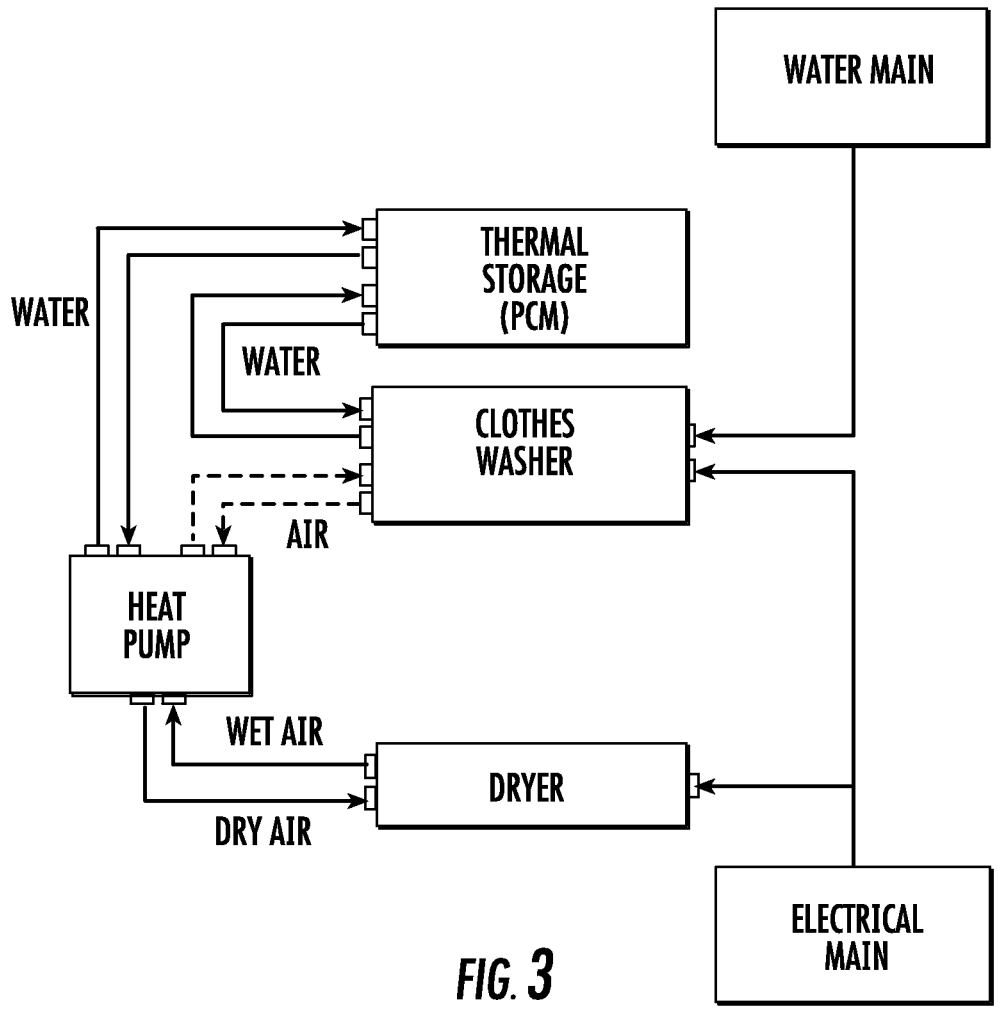
FIG. 3 is a schematic flow diagram of utility flow through an embodiment of an appliance system according to an embodiment of the present invention.

The thermal energy bearing fluid may be any gas or liquid. Additionally, as discussed above, the thermal energy generator is typically a high efficiency heat pump, but can be another heating source such as an electrical resistor heating subsystem. When employed, the heat pump is typically capable of receiving air, typically wet exhausted air from the dryer as well as air or water directly from a clothes washer and/or a thermal storage unit as generally shown in FIG. 3. As such, the heat pump system provides a combined heating solution for both the washing machine and the drying machine of a washer and dryer appliance group. The heat pump module improves washer and dryer efficiency by better sharing the thermal energy/heat between the two appliances.

Figure 4:
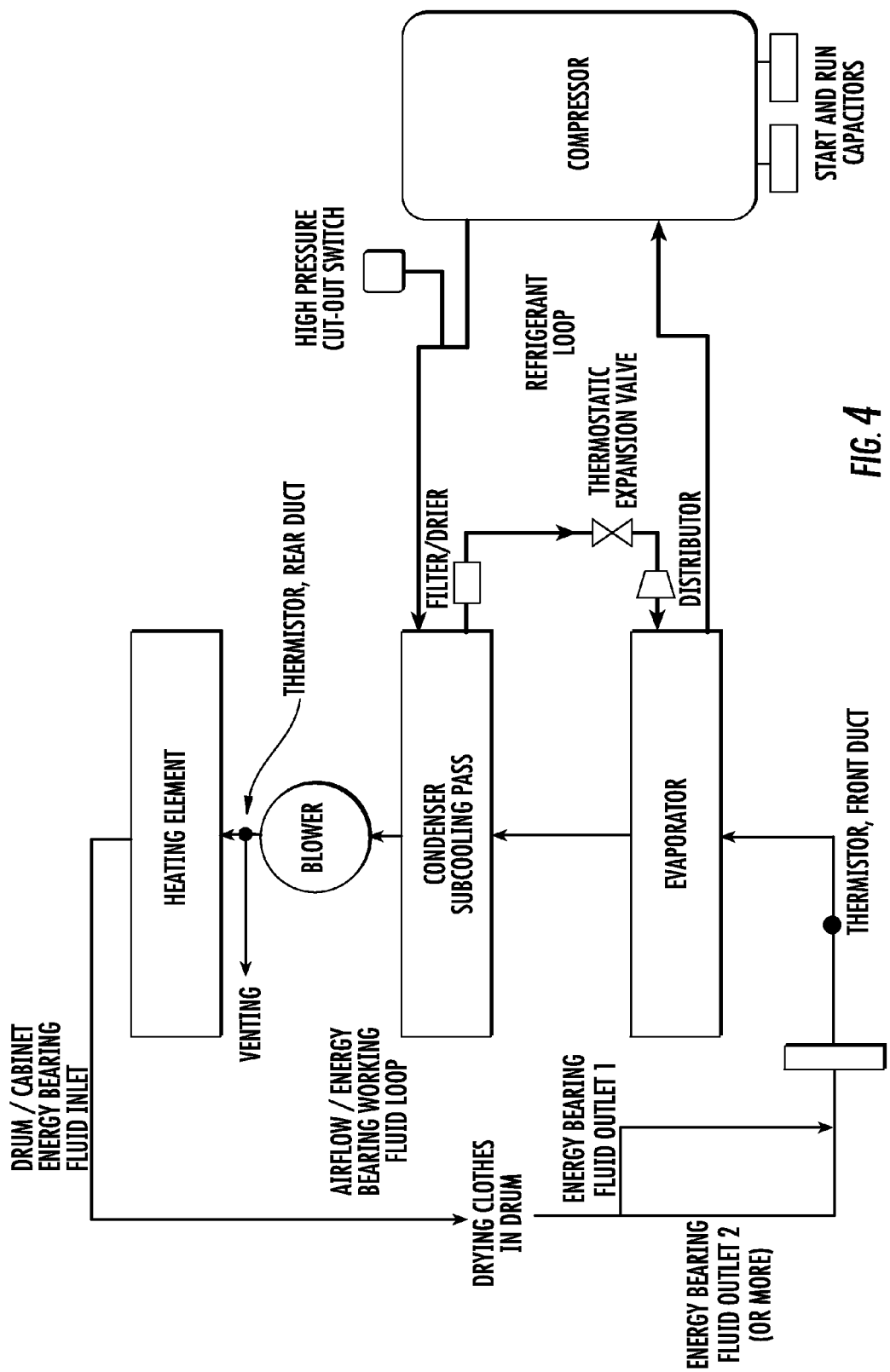
FIG. 4 is a schematic of a dryer and thermal energy generator closed loop system according to an embodiment of the present invention.

The moist air with a higher temperature than ambient with sensible and latent heat content coming from the outlet of the dryer is, according to one embodiment of the present invention, not vented to the outside of a building, typically a residential dwelling, but re-circulated through the heat exchangers, the evaporator, and the condenser of the heat pump (See FIG. 4). The evaporator of the heat pump system recovers the sensible and latent heat from the moist air by condensing the water vapor thereby capturing what was previously waste heat exhausted out of conventional dryers. The recovered energy, according to one embodiment, is then used to heat the drying air in the condenser subsystem of the heat pump. FIG. 4 shows a schematic of a high efficiency heat pump electric dryer linked system. The energy efficient closed loop flow operation of the dryer is enabled by re-circulating air. The re-circulated air is first dehumidified and then heated. The heat exchanger(s), typically two heat exchangers, in the heat pump system work in serial in the air flow path. The evaporator absorbs the heat and condenses the moisture out of the re-circulated air. The condenser supplies heat to the dry air. The process goes from an initial wrap-up phase to a constant rate phase, then to a falling rate phase varying with time. With the exception of a small heat loss during the constant rate, all the sensible heat lost by the air is converted into latent heat of the water vapor in the drying air.

The electrical resistance heater may at maximum produce the amount of heat equivalent to the electrical power being provided. Because the heat pump system has a co-efficient of performance much higher than one, for example three, the electrical energy input to the compressor results in three units of heat input to the washing water or the drying air. The heat pump system, therefore potentially uses only one-third the energy input of a comparable electrical resistance heater used for heating the water and heating the dryer air. The closed loop air circulation in the dryer prevents the dryer from taking conditioned air from the building (typically a residential home), as opposed to conditioned air being exhausted out in the conventional air-vented dryer. As such, the new system reduces the cooling load on the air conditioning system of the overall building or the heating load on the heating system in the winter.

The coupled appliance group and heat pump, typically the clothes dryer, clothes washer, and heat pump provides other benefits such as low temperature drying of clothes which promotes good fabric care (minimum fabric shrinkage, less wrinkle formation, and reduction of fiber aging).

If a user runs two consecutive loads at the same time in a washer and dryer pair, meaning one load in a washer and another one in the dryer, the condenser, according to an embodiment of the present invention, accurately distributes heating loads between the washer and the dryer based upon the washer and dryer's different heating requirements. This is similarly true of the appliances other than a clothes washer and a clothes dryer.

The thermal storage unit 36 typically captures thermal energy using a phase change materials' (PCM) latent heat storage and can be achieved through solid-solid, solid-liquid, liquid-gas, and solid-gas phase change. However, according to the present invention, the phase change material used is typically a solid-liquid phase change material. The solid-liquid phase change material typically behaves like sensible heat storage materials initially. The temperature rises as they absorb thermal energy (heat). Unlike conventional heat storage materials, when phase change materials reach the temperature at which they change phase, they absorb large amounts of heat at an almost constant temperature. The phase change material absorbs heat without a significant raise in temperature until all the material is transformed to the liquid phase (in a solid-liquid phase change material). As the ambient temperature around the liquid phase change material falls, the phase change material solidifies, releasing its stored latent heat. The phase change materials of the present invention may include organic phase change materials, inorganic phase change materials, a eutectics material (organic-organic, organic-inorganic, inorganic-inorganic compounds). For example, phase change materials may include fatty acids and salt hydrates. Phase change materials for use in the present invention are typically non-toxic, non-corrosive, and not hygroscopic.

When a washer and dryer pair are two of the appliances of an appliance group according to the present invention, the interlinkage of the washer and dryer provides another unique benefit. The fins of the heat exchanger(s) can capture the lint thereby fouling the heat exchanger surface. When the washer and dryer are coupled, the rinse water coming from the washer side can serve as a lint cleaning method for the heat exchanger(s). The condensate can wash out some lint from the condenser surface and the at least substantially clean rinse water from the washer can flush away the lint left on the heat exchanger(s) surface(s).

The thermal energy generator, typically the heat pump, may be positioned within the pedestal or housing within a pedestal outside the appliance or within the housing of one of the appliances of the appliance group. Similarly, the thermal storage unit may be positioned external to the appliance group, within a pedestal below one or more of the appliances from the appliance group, or within the main housing of one of the appliances of the appliance group. As shown in FIG. 2, the heat pump 32 is shown in the pedestal below the dryer and the thermal storage unit 36 is shown below the washer in FIG. 2.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An appliance system comprising:
   an appliance group that includes at least two appliances including:
   a first appliance designed to perform a first consumer function related to the first appliance;
   a second appliance that is separate from the first appliance wherein the second appliance is designed to perform a second consumer function related to the second appliance;
   a thermal energy generator wherein the thermal energy generator heats at least one thermal energy bearing fluid, the thermal energy generator is operably connected to the first appliance and the second appliance, and the thermal energy generator delivers thermal energy to the first and second appliance simultaneously or at different times via one or more of the thermal energy bearing fluids; and
   a thermal storage unit operably connected to the thermal energy generator via two conduits to allow energy to be transferred bi-directionally between the thermal storage unit and the thermal energy generator, and operably connected to the first appliance via a conduit to allow another energy bearing fluid to be transferred between the thermal storage unit and the first appliance in a first direction.

2. The appliance system of claim 1, wherein the thermal energy generator is separately, operably connected to the first appliance and the second appliance, and provides thermal energy to at least one of the first and/or second appliance for performance of the consumer function related to the appliance.

3. The appliance system of claim 1, wherein the thermal energy generator comprises a heat pump.

4. The appliance system of claim 3, wherein the thermal storage unit stores thermal energy for later use by one or more utilities to be delivered to the first appliance and the second appliance when needed, wherein the one or more utilities to be delivered to the first and second appliances when needed are chosen from the group consisting of a thermal energy bearing liquid, a thermal energy bearing gas, and combinations thereof, which are supplied to and from the first and second appliance via conduits operably connected to the thermal storage unit.

5. The appliance system of claim 4, wherein the energy bearing fluid comprises an energy bearing fluid chosen from the group consisting of: water, air, and a combination of water and air,
   wherein the first appliance comprises:
      a first appliance housing containing a chamber for receiving fabric articles for processing by the first appliance,
      at least one utility inlet,
      at least one utility outlet,
      an electrical source connector that supplies electrical power to the first appliance, and
      a water connection that receives an intake of water from a water main,
   wherein the second appliance comprises:
      a housing containing a chamber for receiving fabric articles for processing, at least one utility inlet, at least one utility outlet, and an electrical power inlet, and wherein the first appliance and the second appliance are operably connected with one another, the heat pump, and the thermal storage unit.

6. The appliance system of claim 4, wherein the thermal storage unit comprises a phase changing material that is capable of storing and releasing thermal energy.

7. The appliance system of claim 3, wherein the first and second appliances consist of a residential home washer and a residential home dryer.

8. The appliance system of claim 1, wherein the thermal storage unit is further operably connected to the first appliance via a second conduit to allow yet another energy bearing fluid to be transferred between the thermal energy generator and the first appliance in a second direction, wherein the thermal storage unit stores thermal energy for later use by one or more utilities to be delivered to the first appliance and the second appliance when needed wherein the one or more utilities to be delivered to the first and second appliances when needed are chosen from the group consisting of a thermal energy bearing liquid, a thermal energy bearing gas, and combinations thereof, which are supplied to and from the first and second appliance via conduits operably connected to the thermal storage unit.

9. The appliance system of claim 8, wherein the thermal storage unit comprises a phase changing material that is capable of storing and releasing thermal energy.

10. The appliance system of claim 1, wherein the appliance comprises a home appliance energy relay and storage system, the first and second appliances are residential home appliances, and the thermal energy generator comprises a heat pump.

11. The appliance system of claim 1, wherein the appliance group comprises at least two appliances chosen from the group consisting of one or more residential home appliances; one or more commercial appliances, and combinations thereof, and the thermal energy generator comprises a heat pump.

12. The appliance system of claim 1, wherein the thermal energy generator comprises a heat pump that comprises:
one or more heat exchangers,
an evaporator that recovers heat from moist air, and
a condenser.

13. The appliance system of claim 1, wherein the thermal energy generator comprises:
a heat pump that comprises one or more heat exchangers,
an evaporator that recovers heat from moist air, and
a condenser.

14. The appliance system of claim 13, wherein the second appliance is a dryer that delivers heated air to a chamber of the dryer that receives fabric articles to be treated, wherein at least a portion of the dryer is not vented to the outside of a building, and wherein the evaporator recovers heat from air exhausted from the dryer.

15. The appliance system of claim 1, wherein the second appliance is a dryer that delivers heated air to a chamber of the dryer that receives fabric articles to be treated, wherein at least a portion of the dryer is not vented to the outside of a building, and wherein an evaporator recovers heat from air exhausted from the dryer.

16. The appliance system of claim 1,
wherein the energy bearing fluid comprises water;
wherein the first appliance is a residential fabric article washing machine that comprises a first appliance housing, a water inlet, a water outlet, an air inlet, an air outlet, a first appliance electrical source connector, and a main water connection that receives an intake of water from a water supply plumbing line;

wherein the second appliance is a residential fabric article drying machine that comprises a second appliance electrical source connector, an air outlet, and an air inlet;

wherein the thermal energy generator comprises a heat pump having at least two air inlets and at least two air outlets, a water inlet, and a water outlet; and wherein the appliance system further comprises:
washing machine water conduits that operably connect the water outlet of the washing machine with the water inlet of the heat pump, and the water inlet of the washing machine with the water outlet of the heat pump;
washing machine air conduits that operably connect the air outlet of the washing machine with the air inlet of the heat pump and the air inlet of the washing machine with the air outlet of the heat pump; and
drying machine conduits that operably connect the air inlet of the drying machine with the air outlet of the heat pump and the air outlet of the drying machine with the air inlet of the heat pump; and wherein water is allowed to flow to and from the heat pump and the washing machine via the washing machine water conduits, and air is allowed to flow to and from the heat pump and the washing machine via the washing machine air conduits, and air is allowed to flow to and from the drying machine via the drying machine conduits.

17. The appliance system of claim 16, further comprising a thermal storage device having a thermal storage device having two water inlets and water outlets,
wherein the thermal storage device comprises a phase changing material that stores and releases thermal energy;
wherein the thermal storage device is positioned within an appliance energy relay and storage system between the washing machine and the heat pump to allow water to pass through the thermal storage device as water passes between the washing machine and the heat pump; and
wherein the heat pump is positioned with a pedestal of the drying and the thermal storage device is positioned within the pedestal of the drying machine.

18. A method of delivering, recovering, storing, and redistributing thermal energy between separate appliances of an appliance group comprising:
providing an appliance group that includes at least two appliances including:
a heat pump;
a first appliance designed to perform a first consumer function related to the first appliance; and
a second appliance that is separate from the first appliance wherein the second appliance is designed to perform a second consumer function related to the second appliance; and
a thermal storage unit operably connected to the heat pump and the first appliance via one or more conduits to allow an energy bearing fluid to be transferred to and from the heat pump and to and from the first appliance and wherein the thermal storage unit stores thermal energy for later use by one or more utilities to be delivered to the first appliance and the second appliance when needed wherein the one or more utilities to be delivered to the first and second appliances when needed are chosen from the group consisting of a thermal energy bearing liquid, a thermal energy bearing gas, and combinations thereof, which are supplied to and from the first and second appliance via conduits operably connected to the thermal storage unit;

delivering thermal energy to a first amount of the thermal energy bearing fluid using the heat pump and conveying the heated thermal energy bearing fluid to at least one of the first home appliance and the second home appliance for use in processing fabric articles until the first amount of the thermal energy bearing fluid becomes used, heated thermal energy bearing fluid;

recovering thermal energy from the used heated thermal energy bearing fluid that remains using the thermal storage unit;

storing the recovered thermal energy in the thermal storage unit;

redistributing the thermal energy to a second amount of thermal energy bearing fluid and conveying the heated second amount of thermal energy bearing fluid to the heat pump if further thermal energy is needed and then to at least one of the first or second home appliances or conveying the heated second amount of thermal energy bearing fluid to at least one of the first home appliance or the second home appliance without thermal energy being supplied by the heat pump.

* * * * *